June 26, 1934.   J. P. BURKE ET AL   1,963,968
PURIFICATION OF ESTERS
Filed Feb. 16, 1932
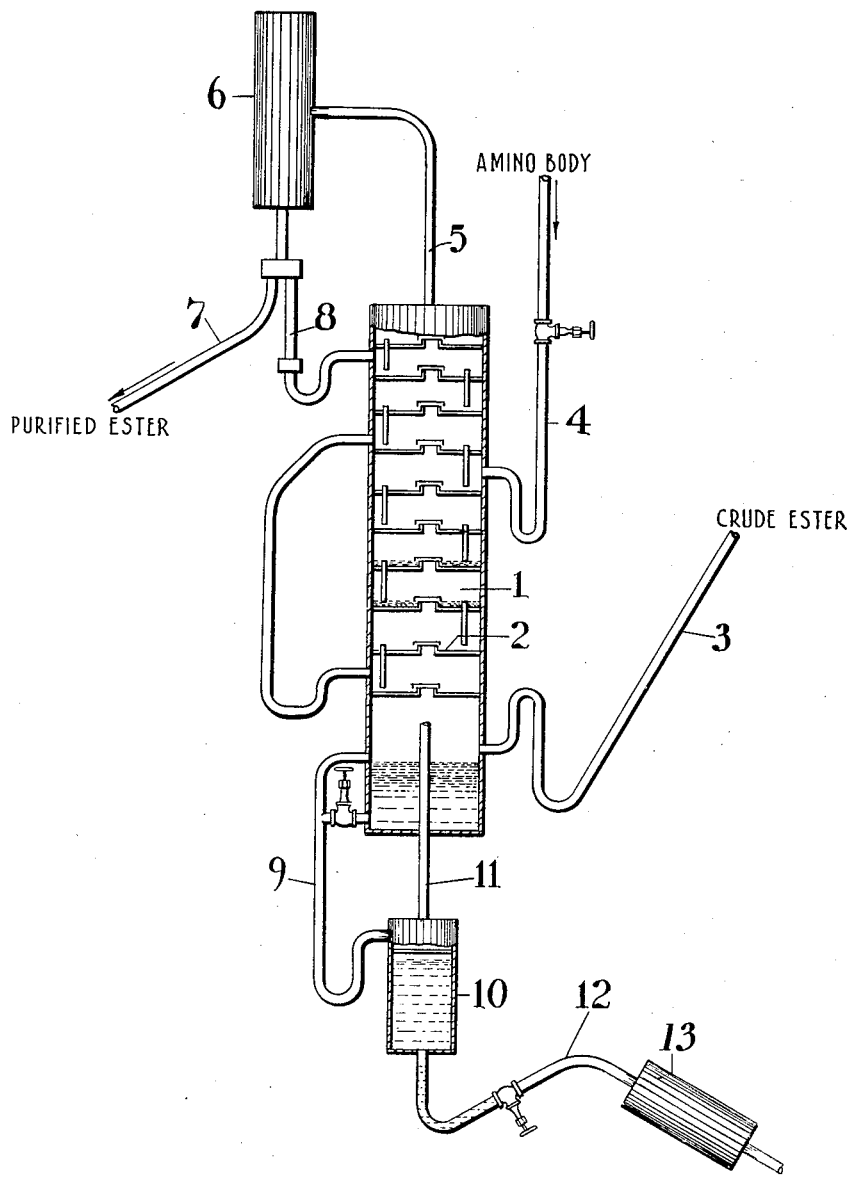
Joseph P. Burke
Carrol A. Doran
BY
INVENTORS
J. M. Castle Jr.
ATTORNEY.

Patented June 26, 1934

1,963,968

UNITED STATES PATENT OFFICE 1,963,968

PURIFICATION OF ESTERS

Joseph P. Burke, Highland Park, and Carrol A. Doran, Parlin, N. J., assignors to E. I. du Pont de Nemours & Company, Wilmington, Del., a corporation of Delaware Application February 16, 1932, Serial No. 593,220

17 Claims. (Cl. 260—106)

This invention relates to a process of purifying aldehyde-containing esters, and more particularly relates to a process of removing the aldehydes or substantially lowering the aldehyde content of aldehyde-containing lower alkyl esters of lower fatty acids, by bringing such esters into contact with an amino compound.

It is known that the lower alkyl esters of lower aliphatic acids made by certain esterification processes contain aldehydes, the presence of which are very objectionable in many uses to which the esters are to be put. This is particularly true where the esters are to be used as solvents in the manufacture of lacquers, and the like, as the aldehydes have a tendency to discolor the ester, resulting in the final lacquer being off color. Furthermore, these aldehydes are the source of a disagreeable odor and have a tendency to oxidize to acids, giving the esters undesirable properties.

The removal of these aldehyde impurities from esters has heretofore been considered and various oxidizing agents have been suggested for this purpose. However, these agents did not appreciably reduce the aldehyde content of the esters and have not been commercially successful.

An object of the present invention is to provide a practical and economical process of removing aldehyde impurities from esters, or substantially reducing the proportion of the aldehyde impurities. A further object is to provide such a process which may be carried out continuously. Still further objects will be apparent from the description of the invention given hereinafter.

The above objects are accomplished according to the present invention by bringing the aldehyde-containing esters into contact with an amino compound whereby the aldehydes contained in the ester react with the amino compound, and then subsequently separating the ester from the reaction product and any excess amino compound.

This process may be carried out in several ways. For instance, the ester may be vaporized and passed through the amino compound in liquid state, or the amino compound may be vaporized and passed through the ester in liquid state, or the ester and amino compound, both in liquid state, may be introduced into a still kettle and refluxed until the amino compound has reacted with the aldehydes contained in the ester, and the ester then recovered in purified state by fractional distillation. When the process is carried out using an amino compound in the liquid state, an amino compound which is liquid at the temperature of the reaction may be used, or a solid amino compound dissolved in an inert solvent may be used. In order to secure maximum removal of the aldehyde contamination, the amino compound should be used in excess of molecular proportion with respect to the aldehyde impurity.

The following examples are given to illustrate preferred embodiments of the invention:

*Example 1.*—The following charge was placed in a still kettle: 100 grams of contaminated ethyl acetate (0.62% aldehydes), 1.1 gram of aniline, and 0.2 grams of sulphuric acid. This charge was refluxed for 15 minutes and subsequently fractionally distilled to separate the purified ester. An analysis of the purified ethyl acetate showed an aldehyde content of 0.042%. The purpose of the sulphuric acid was merely to act as a catalyst, a slight improvement being noted in some cases through the use of such a catalyst.

*Example 2.*—The following charge was placed in a still kettle: 50 grams of contaminated ethyl acetate (0.995% aldehydes), 0.80 grams of aniline, and 0.35 grams of sulphuric acid. These materials were refluxed for a period of 15 minutes as in Example 1. An analysis of the purified ester separated by fractional distillation showed an aldehyde content of 0.196%.

The two above examples illustrate the process wherein both the ester and amino compound are in liquid state. Carrying out the process in this manner, a solid amino compound dissolved in the ester being treated, or some other solvent, could be used. For example, acetanilide dissolved in ethyl acetate.

The following three examples illustrate a more continuous modification of the process wherein the aldehyde contaminated ester was bubbled through aniline in the still kettle, the temperature being maintained at approximately 150° C. Where the term "two passes" or "three passes" is used, reference is made to the number of times the ester is passed through the purifying medium.

*Example 3.*—Butyl acetate, 876 grams, butyraldehyde, 28 grams (impurity), aniline, 50 grams. At the end of the second pass of the contaminated ester containing butyraldehyde through the aniline, an analysis of the purified ester showed but 0.80% aldehyde and a third pass reduced the aldehyde content still further to 0.17%.

*Example 4.*—Ethyl butyrate, 879 grams, butyraldehyde, 46 grams (impurity), and aniline, 50 grams. At the end of the second pass of the contaminated ester through the aniline an analysis of the purified ester showed 1.21% aldehyde and a third pass produced an ester with an aldehyde content of 0.245%.

*Example 5.*—Ethyl acetate, 444 grams, crotonyl aldehyde, 7 grams (impurity), and aniline, 25 grams. One pass of this contaminated ester through the aniline reduced the aldehyde content to 0.119%, and a second pass further reduced the aldehyde content to 0.03%.

In the above three examples the ester in vapor state is passed through the amino compound in liquid state. In this modification it is apparent that the amino compound must have a boiling point appreciably higher (at least 15° C.) than that of the ester being treated. Either a high boiling amino compound, such as aniline, may be used, or an amino compound such as acetanilide, which is solid at ordinary temperatures but liquid at the temperature of reaction.

In a preferred embodiment of the invention, the process is carried out continuously by scrubbing the aldehyde contaminated ester in vapor state with an amino compound in liquid state flowing counter current to the ester vapors in a column provided with a series of conventional bubbler plates, the amino compound, together with the reaction product of the amino compound and the aldehyde impurities in the ester vapors, being drawn off at the bottom of the column and the purified ester vapors from the top of the column.

Referring to the single figure of the drawing, 1 represents a still column provided with a series of conventional bubbler plates 2. An inlet pipe 3 serves to introduce crude ester into the column, which is heated sufficiently at the bottom to vaporize the ester introduced, the vapors passing up through the bubbler plates 2 down which flows an amino body in liquid state supplied by the pipe 4. The ester vapors are removed through the pipe 5 at the top of the column 1 to the condenser 6, the condensed ester being drawn off through the pipe 7 or a small portion may be run through the connection 8, back into the column adjacent the top thereof to maintain reflux action at the top of the column. An overflow pipe 9 adjacent the base of the column serves to continuously remove the liquid amino compound and reaction products collecting at the bottom of the still; condensed ester vapor carried down the column with the amino compound is again vaporized at the bottom of the column, which is kept at a temperature above the boiling point of the ester. The overflow pipe 9 leads to the reboiler 10, which is heated to a temperature considerably above the boiling point of the ester being treated, but lower than the boiling point of the amino compound. Any ester still carried by the amino compound is vaporized in the reboiler and led back into the column 1 through the pipe 11. The amino compound and reaction products are drawn off through the pipe 12 to the condenser 13 where they may be led back into the column 1 for further use, if desired.

The following specific example illustrates the purification of ethyl acetate by means of aniline in the continuous process carried out in the apparatus described above:

*Example 6.*—Aldehyde contaminated ethyl acetate is introduced into the column 1 through pipe 3 at the rate of 180–200 gallons per hour; the temperature of the bottom of the column is kept at 88–90° C., causing the ester to vaporize and pass up through the column. Aniline is introduced through the pipe 4 at the rate of 4–6 gallons per hour. The ester vapors pass through the pipe 5 into the condenser 6 and the condensed ester is then drawn off through the pipe 7 except for a small proportion run through the pipe 8 back into the column 1 to maintain reflux action at the top of the column. If the aniline is being used a second time, the rate of flow should be stepped up to 6–9 gallons per hour, and if being used a third time, to 9–12 gallons per hour. The reboiler is kept at a temperature of 130° C. which is sufficient to vaporize any ethyl acetate retained by the aniline without danger of vaporizing the aniline or the aniline-aldehyde reaction product.

In this process the temperature at the base of the column should not exceed 90° C. as ethyl acetate has a tendency to react with aniline at higher temperatures, forming acetanilide, a solid which will cause trouble through clogging up the overflow pipe. In large scale operation, this process maintains an efficiency of around 90%. Ethyl acetate containing 1.5% aldehyde impurities (acetaldehyde and butyraldehyde chiefly) may be readily reduced to 0.1% aldehyde impurity. Ethyl acetate containing 0.35% to 0.55% aldehyde impurities may be readily reduced to 0.03% to 0.06%, and on occasions the above process has functioned to reduce the aldehyde content as low as 0.008% from the original aldehyde content of approximately 0.4%.

In carrying out this process it is advisable to introduce the amino compound at a point part way down the column, since if it is introduced at the very top of the column there is danger of the purified ester being contaminated with aniline. Also, in an efficient operation of this process, care should be taken to insure an excess of aniline in the column at all times. Although in purifying ethyl acetate with aniline it is important not to exceed a temperature of 90° C. at the bottom of the column due to the danger of formation of acetanilide, this does not apply where other esters are being purified since the formation of acetanilide occurs only with ethyl acetate.

The above examples merely illustrate specific embodiments of the invention which is broadly applicable to the purification of the lower alkyl esters of the lower fatty acids, that is, esters in which the alkyl group contains 1–6 carbon atoms, inclusive, and the acid contains 1–5 carbon atoms, inclusive. Some of the common esters which may be purified by this process are as follows: Methyl acetate, ethyl propionate, ethyl butyrate, ethyl valerate, propyl propionate, butyl propionate, butyl butyrate, propyl butyrate, propyl acetate, butyl acetate, amyl acetate, amyl propionate, and hexyl acetate.

The term "amino compound" as used herein is meant to include ammonia, amines, and compounds having a basic radical including the group

and such compounds as would be formed by substitution of one or two of the hydrogen atoms by such groups as monovalent hydrocarbon groups, OH groups, and amine groups, as well as the additive acid salts of such substituted products. Amino compounds that are particularly suitable for use in this process include aniline, aniline acetate, aniline sulphate, phenylhydrazine, diphenylamine, methylamine, ethylamine, propylamine, naphthylamine, hydroxylamine, and ammonia.

It will be understood that the selection of any particular amino compound will be dependent upon the modification of the process to be used and the boiling point of the ester to be treated. Where either the amino compound or the ester is to be in the vapor state and the other in a liquid state, a difference of at least 15° C. in boiling point is necessary, and preferably a considerably greater difference. Where both the amino compound and the ester are to be in the liquid state, it is only necessary that the respective boiling points are separated enough to insure complete separation by fractional distillation. A difference of at least 15° C. in boiling points is also preferred here.

The advantages of the process according to the present invention over those of the prior art are primarily that the aldehyde contamination can be substantially eliminated whereas heretofore this has not been commercially feasible. Furthermore, the present process may be economically carried out without great detailed attention and with great economy of time. The continuous modification of the process described above is preferred in that it is more economical on a commercial scale. The removal of aldehyde contamination is greater and the general operation is more efficient.

As many apparently widely different embodiments of this invention may be made without departing from the spirit and scope thereof, it is to be understood that the invention is not limited to the specific embodiments thereof except as defined in the appended claims.

We claim:

1. Process of purifying an aldehyde contaminated lower alkyl ester of a lower fatty acid which comprises bringing an amino compound having at least one hydrogen atom directly attached to the nitrogen atom into contact with the ester whereby the aldehyde contained in said ester reacts with the amino compound, and separating the ester from said amino compound and the reaction product.

2. Process of purifying an aldehyde contaminated lower alkyl ester of a lower fatty acid which comprises bringing aniline into contact with the ester whereby the aldehyde contained in said ester reacts with the aniline, and separating the ester from said aniline and the reaction product.

3. Process of purifying aldehyde contaminated ethyl acetate which comprises bringing an amino compound having at least one hydrogen atom directly attached to the nitrogen atom into contact with the ethyl acetate whereby the aldehyde contained in said ethyl acetate reacts with the amino compound, and separating the ethyl acetate from said amino compound and the reaction product.

4. Process of purifying aldehyde contaminated ethyl acetate which comprises bringing aniline into contact with the ethyl acetate whereby the aldehyde contained in said ethyl acetate reacts with the aniline, and separating the ethyl acetate from said aniline and the reaction product.

5. Process of purifying an aldehyde contaminated lower alkyl ester of a lower fatty acid which comprises passing an amino compound having at least one hydrogen atom directly attached to the nitrogen atom in vapor state through the ester in liquid state whereby the aldehyde contained in said ester reacts with the amino compound, and separating the ester from the reaction product.

6. Process of purifying an aldehyde contaminated lower alkyl ester of a lower fatty acid which comprises passing ammonia through the ester in liquid state whereby the aldehyde contained in said ester reacts with the ammonia, and separating the ester from the reaction product.

7. Process of purifying an aldehyde contaminated lower alkyl ester of a lower fatty acid which comprises passing the ester in vapor state through an amino compound having at least one hydrogen atom directly attached to the nitrogen atom in liquid state whereby the aldehyde contained in said ester reacts with the amino compound, and separating the ester from said amino compound and the reaction product.

8. Process of purifying an aldehyde contaminated ester which comprises passing the ester in vapor state through aniline in liquid state whereby the aldehyde contained in said ester reacts with the aniline, and separating the ester from the aniline and the reaction product.

9. Process of purifying aldehyde contaminated ethyl acetate which comprises passing the ethyl acetate in vapor state through an amino compound having at least one hydrogen atom directly attached to the nitrogen atom in liquid state whereby the aldehyde contained in said ethyl acetate reacts with the amino compound, and separating the ethyl acetate from said amino compound and the reaction product.

10. Process of purifying aldehyde contaminated ethyl acetate which comprises passing the ethyl acetate in vapor state through aniline in liquid state whereby the aldehyde contained in said ethyl acetate reacts with the aniline, and separating the ethyl acetate from the aniline and the reaction product.

11. Process of purifying an aldehyde contaminated lower alkyl ester of a lower fatty acid which comprises continuously vaporizing the ester, passing the vapors up through successive layers of an amino compound having at least one hydrogen atom directly attached to the nitrogen atom in liquid state whereby the aldehyde contained in said ester reacts with the amino compound, and continuously adding fresh amino compound to said layers and withdrawing the reacted amino compound.

12. Process of purifying an aldehyde contaminated lower alkyl ester of a lower fatty acid which comprises continuously vaporizing the ester, passing the vapors up through successive layers of aniline in liquid state whereby the aldehyde contained in said ester reacts with the aniline, and continuously adding fresh aniline to said layers and withdrawing the reacted aniline.

13. Process of purifying aldehyde contaminated ethyl acetate which comprises continuously vaporizing the ethyl acetate, passing the vapors up through successive layers of an amino compound having at least one hydrogen atom directly attached to the nitrogen atom in liquid state whereby the aldehyde in said ethyl acetate reacts with the amino compound, and continuously adding fresh amino body to said layers and withdrawing the reacted amino compound.

14. Process of purifying aldehyde contaminated ethyl acetate which comprises continuously vaporizing the ethyl acetate, passing the vapors up through successive layers of aniline in liquid state whereby the aldehyde in said ethyl acetate reacts with the aniline, and continuously adding fresh aniline to said layers and withdrawing the reacted aniline.

15. Process of purifying an aldehyde contaminated lower alkyl ester of a lower fatty acid which comprises passing the ester in vapor state up through a column provided with bubbler plates while passing down said column an amino compound having at least one hydrogen atom directly attached to the nitrogen atom in liquid state, the temperature at the bottom of the column being maintained above the boiling point of the ester and below the boiling point of the amino compound.

16. Process of purifying an aldehyde contaminated lower alkyl ester of a lower fatty acid which comprises passing the ester in vapor state up through a column provided with bubbler plates while passing down said column aniline in the liquid state, the bottom of the column being maintained at a temperature above the boiling point of the ester and below the boiling point of the aniline.

17. Process of purifying aldehyde contaminated ethyl acetate which comprises passing the ethyl acetate in vapor state up through a column provided with bubbler plates while passing down said column aniline in the liquid state, the bottom of the column being maintained at a temperature above the boiling point of the ethyl acetate but not exceeding 90° C.

JOSEPH P. BURKE.
CARROL A. DORAN.